UNITED STATES PATENT OFFICE 2,506,597

LUBRICANTS

Everett C. Hughes, Cleveland Heights, and John D. Bartleson, Cleveland, Ohio, assignors to The Standard Oil Company, Cleveland, Ohio, a corporation of Ohio No Drawing. Application December 19, 1945, Serial No. 636,073

9 Claims. (Cl. 252—32.7)

This invention relates to lubricants and lubricant additives suitable for use under various conditions including high temperatures or high pressures, or both, as for example, use in combustion engines operating at higher temperatures and in which the lubricant is in close contact with metal surfaces, metal compounds and high temperature gases. Lubricating oils, particularly when used under higher temperature conditions are subject to break-down. In internal combustion engines this break-down is accompanied by lacquer deposition, sludge and acid formation, and a tendency to cause corrosion of the bearing and other metals with which the oils are in contact.

In order to minimize or preferably to avoid serious deterioration, it is highly desirable to use lubricants which show a minium of, or are entirely free of, the above mentioned objectionable effects.

It is an object of the present invention to provide an agent which may be usable itself as a lubricant, and when added to lubricating oils, greases and other lubricants will markedly inhibit their objectionable characteristics such as the deposition of lacquer, acid and sludge formation, corrosion and other types of harmful effects.

It is a further object of the invention to provide lubricating oils containing such an addition agent.

Another object of this invention is to provide heretofore unknown compositions containing combinations of elements not heretofore contained in products of this type, together with processes for their production.

Another object is to provide novel compositions which are superior in their functions to other compositions now available and intended for these same general purposes.

Other objects of this invention will be apparent as it is more fully disclosed hereinafter.

It has been discovered, in accordance with the invention, that higher ketones may be reacted at higher temperatures with a sulfide of phosphorus, such as the readily available phosphorus pentasulfide; and that this higher temperature reaction product may be further treated with an element of the sulfur family in elemental form or a compound yielding the element to give products which have a high solubility in lubricating oils and greases. Such products have highly advantageous properties as additives for lubricants, especially for imparting antioxidant and corrosion inhibition characteristics thereto. Alternatively, the first reaction step may be carried out at lower temperature and the reaction product subsequently subjected to the higher temperature either before, during or after the incorporation of an added sulfur family element. The elements of the sulfur family referred to are sulfur, selenium and tellurium.

The sulfide-ketone high temperature reaction product containing an added sulfur element, when converted into a metal derivative or compound has the additional property of imparting detergent qualities to lubricating oils, and thereby prevent excessive lacquer formation on the pistons especially in heavy duty service. The metal element may be introduced before or after the incorporation of the sulfur element, and if the previous steps did not include the higher temperature, the reaction product may be subjected to the higher temperature during or after the incorporation of a metal element.

The metal derivative or compound is readily made in three steps, the first of which is the reaction between the sulfide and the higher ketone to give a product containing a residue of the sulfide reactant, the second of which involves the incorporation therein of an element of the sulfur family, and the third of which involves the reaction of a metal or basic metal compound with the sulfide-ketone reaction product containing an added sulfur element to give a metal derivative or compound thereof containing a residue of the metal or metal compound reactant. Alternatively the sulfide-ketone reaction product may be reacted with the metal and then with the added sulfur element. At least one of the three steps should be carried out at the higher temperature or if all are carried out at a lower temperature the resulting product should be subjected to the higher temperature. It is to be emphasized that the use of the higher temperature is essential because a different and superior product is obtained as compared with the use of a lower temperature. When the higher temperature is used in the initial sulfide-ketone reaction a different chemical combination tabes place than at a lower temperature, i. e. 250° F. to 300° F. When the lower temperature reaction product, even though the added sulfur element and/or the metal has been introduced, is heated to the higher temperature a change takes place which results in the new product.

The sulfide-ketone reaction may be carried out with direct admixture of the reactants or by their admixture in the presence of a diluent which may or may not be subsequently removed. A volatile inert solvent may be used as a diluent which is to be subsequently removed. Alternatively, a heavier oil such as white oil, or a lubricating oil of about the same properties as that to which the new composition is to be added, may be used as a diluent which is not to be removed. In a commercial embodiment of the invention, a mineral oil diluent probably would be used, since it would not have to be removed.

The sulfide-ketone reaction may be carried out at a temperature over a wide range, but in general, the temperature should be at least about 400° F., at least about 425° F. being much better, desirably in the range of about 450° to 600° F., and preferably at about 500 F., at atmospheric pressure. This temperature range is referred to as the higher temperature. If desired, the reaction may be carried out at a lower temperature and the resulting product subjected to the above higher temperature treatment as explained heretofore. Economy of heat suggests that a temperature higher than that necessary to achieve the wanted reaction product will be wasteful. The temperature should not be so high as to decompose the reaction product, and 600° F. may be viewed as a practical economical upper limit, although higher temperatures produce a satisfactory product. The reaction is somewhat exothermic and on a commercial scale, the heat evolved thereby may be used to maintain the temperature. The ingredients may be added in increments if this is desirable for temperature control or for other reasons.

This reaction may be completed in from a few minutes to 10 hours. The reaction time is a function of the temperature, the relative amounts of the reactants, the subdivisions thereof, rate of admixture of the reactants, the rate of agitation, etc. The reaction is usually completed in about 4 hours or less time. A sludge or insoluble material is formed as a by-product. This may be removed by settling, filtration or centrifuging, along with any undissolved reactants. Very good yields of the desired product are readily obtained. Mol ratios of one mol of the ketone or ketones to from 0.1 to about 2.0 or more mols of sulfide may be used. Even small amounts show significant improvements. Economic factors may make it undesirable to use more than about 2.0 mols of sulfide. Generally about 0.20 to 1.5 mols of the sulfide is the usual range that will be used, about 0.7 mols of the sulfide per mol of ketone being preferred.

The pentasulfide is preferred although other sulfides may be employed. Phosphorus pentasulfide is economical and readily available and for this reason is used for illustrative purposes.

A large variety of ketones are suitable for the reaction, for example, either aliphatic, alicyclic or acyclic, aromatic or mixed alicyclic or acyclic aliphatic-aromatic ketones including polyketones, provided all the aliphatic radicals therein are saturated. The choice may be limited by the desired lubricant solubility characteristics of the sulfide-ketone reaction product or of the final metal derivative product. Generally, higher ketones are preferred. By higher ketones is meant those having at least twelve carbon atoms in the molecule. Generally the ketone will not have more than 52 carbon atoms. Representative ketones are methyl-dodecyl, xylyl-heptadecyl, di-octadecyl, dicyclohexyl, xylyl-cyclohexyl, cyclohexyl-octadecyl, diheptadecyl, ethyl-heptadecyl, propyl-heptadecyl, and hydroxyaryl-heptadecyl ketones. Commercial dipalmityl ketone

$(C_{15}H_{31})_2CO$ is a readily available higher ketone and for this reason is used in many of the examples given for illustrative purposes.

The ketone stock may be a mixture of ketones of different types or of different molecular weights or both. Generally, the aliphatic or mixed aliphatic-aromatic including aliphatic-hydroxyaromatic ketones are preferred. All the aliphatic radicals in these ketones must be saturated radicals. The ketone stock should contain at least 50.0% ketonic ingredients and preferably 75.0% by weight of the stock.

The sulfur element ingredient is incorporated by adding elemental sulfur, preferably after the formation and cooling of the high temperature primary sulfide-ketone reaction product, if the reaction took place at the higher temperature, and maintaining the mass at a temperature in the range of about 100° to 500° F., preferably about 300° F. for a time in the range of about a few minutes to about four hours, and preferably about one hour. About 0.01 to about 2.0 gram atoms of sulfur per gram mol of the ketone may be used, desirably 0.1 to 0.7, for example, 0.5 gram atom of sulfur per mol of ketone should be used. Selenium or tellurium may be used instead of sulfur, and incorporated similarly. Alternatively, the sulfur element may be added in a similar manner after the metal derivative of the primary sulfide-ketone reaction product is formed.

The primary sulfide-ketone reaction products, with or without an incorporated added sulfur element, may be converted to the metal derivatives or compounds by reaction with one or more metal compounds such as the oxides, sulfides and hydroxides. These metals may be one or more of the following: an alkali metal, such as sodium, potassium and lithium; an alkaline earth metal, such as calcium or barium; or a heavier metal such as aluminum or other metal lower than aluminum on the electromotive series, such as copper, lead, tin, chromium, arsenic, antimony and molybdenum. The metal should be selected with reference to the use of the composition and the properties desired in it. The alkali and alkaline earth metal compounds have excellent detergent characteristics. The above-mentioned heavier metal compounds have surface corrosion inhibition characteristics. A plurality of metals may be used so as to combine the advantages of the lighter metal compounds with those of the heavier metal compounds in one additive. The most important metals are group I, group II, and group III metals of the periodic table, i. e., above manganese in the electromotive force series, such as sodium, potassium, calcium, barium and aluminum, and of these, those above aluminum in the elrectromotive force series are preferred.

The reaction step of forming the metal derivative or compound may be carried out at a temperature in the range of about 100° to 600° F., a temperature of about 180° to 300° F. being preferred if the primary sulfide-ketone reaction product was formed at or was subjected to the higher temperatures. If the primary sulfide-ketone reaction product, with or without added sulfur, was formed at a relatively lower temperature and not subsequently subjected to the higher temperature, the reaction step of forming the metal derivative may be carried out at a higher temperature, such as from 425° to about 600° F., and preferably about 500° F., or alternatively, the metal derivative may be formed at a relatively lower temperature and subsequently subjected to the higher temperature. The reaction may be completed in from about a few minutes to about ten hours time, and the same factors as to reaction time are involved as discussed before. Usually, the reaction is completed in about five hours or less time. A diluent may be used as described heretofore, but it is not necessary. If a diluent was used in a previous reaction step, it may be carried out over into this reaction step and may be subsequently separated, if desired. From about 0.25 to about 6.0 mols of the metal oxide, sulfide or hydroxide and preferably about 3 equivalents thereof may be used per mol of the sulfide used in the first reaction step. Any metal oxides or hydroxides which remain unreacted with the sulfide-ketone reaction product or its metal derivativee or the mentioned diluents are settled with any sludge which is formed as a by-product, and removed as disclosed hereinafter. Very good yields are obtained in this reaction, also.

It may be beneficial to have water present in the reaction and this may be introduced as water of crystallization or as a hydrate of the metal compound or it may be introduced separately.

A plurality of metals can be used, such as sodium and calcium, calcuim and barium, and calcium and aluminum or tin, or other combinations of light and heavy metal compounds. If the amount of the metal is small the final product may be a mixture of the initial reaction product and the metal derivative.

After the reaction with the metal component is complete, the reaction mass is separated from any oil insoluble substances, for instance, by centrifuging or settling followed by filtering or decanting. If a solvent was used as a diluent it may be removed by vacuum distillation, if desired. In most cases the solvent, such as an oil, would be left in the reaction mixture. If a sulfur element was not added previously, it should be added to the metal derivative. The chlorine-containing products of the foregoing types, such as might be obtained by incorporating chlorine into the reaction mixture at any stage of preparing the product, or by starting with a chlorinated ketone, have desirable properties, especially for additives used for E. P. (extreme pressure) lubricant purposes.

The final products may be waxy solids or oils at room temperature. If solids, they melt to form oils, and are soluble in lubricating oils at the usual temperatures and miscible with greases to a sufficient extent to impart the desired additive property to the oil or grease.

These new compositions impart many desirable properties to lubricants to which they have been added. They may act as powerful detergents therein and also as corrosion inhibitors. The metal derivatives are desirable as additives for crankcase lubricating oils wherein good detergency is a desired characteristic and E. P. properties are not usually of much advantage. The additives of the invention are suitable for use in various lubricating oils and greases, such as lubricating oils and greases of the types that may be used in automotive equipment and the like and which will be referred to as vehicular lubricants. In a grease, E. P. properties are usually desirable, but detergency is of less consequence in an additive since the grease contains a large percentage of soap. The primary added sulfur sulfide-ketone additive is particularly applicable here. In gear box lubricants, wherein a heavy oil and no grease is used, both E. P. and detergency are desirable. A mixture of the primary added sulfur product and the metal derivative product is best for this purpose. This mixture may be formed by mixing some of the primary product with some of the metal derivative, or by reacting the primary product with such an amount of metal compound as would give a product having the desired metal derivative content and unreacted primary product content. Such a product might be "tailored" to the requirements incident to its use. The new additives are also suitable for use in distinctly different types of lubricants such as cutting oils.

The amount of the above described sulfide-ketone reaction product or its metal derivative to be added to lubricating oils or greases will depend upon the characteristics of the oil or grease and the intended use. Some oils have more of a tendency to corrode metals or to form acid sludges and lacquer depositions than others and such oils require larger quantities of the addition agent. Oils that are intended for higher temperatures require large amounts of the additive. In general, the range is from about 1.0 to about 12.0%, but under some circumstances, amounts as low as 0.01% show a significant improvement. Since the additive is a lubricant, there is no upper limit, but it may be uneconomical to add more than is necessary to impart to the lubricant the desired properties.

The invention is illustrated by the following preparation of an additive and tests of lubricants containing the additives of the invention. The additive was prepared as a concentrate in an oil solution. In the tested compositions, the given concentration of an additive is the additive itself, as distinguished from the mixture of the reaction product in the oil. These are in nowise to be construed as limitations of the scope of the invention, as otherwise disclosed and claimed herein.

Lubricating oils containing additives of the invention were tested according to laboratory test procedures for evaluating the service stability of oils as described in a paper by R. E. Burk, E. C. Hughes, W. E. Scovill and J. D. Bartleson presented at the Atlantic City meeting of the American Chemical Society in September, 1941, and in another paper by the same authors presented at the New York city meeting of the American Chemical Society in September, 1944, published in Industrial and Engineering Chemistry Analytical Edition, vol. 17, No. 5, May, 1945, pages 302–309. The latter paper also correlates the results of such laboratory tests with the so-called standardized "Chevrolet engine test."

Essentially, the laboratory test equipment consists of a vertical, thermostatically heated large glass test tube, into which is placed a piece of steel tubing of about one-third its length and of much smaller diameter. A piece of copper-lead bearing strip is suspended within and from the upper end of the steel tube by a copper pin, and an air inlet is provided for admitting air into the lower end of the steel tube in such a way that in rising the air will cause the oil present to circulate. The test tube is filled with an amount of the oil to be tested which is at least sufficient to submerge the metals.

The ratios of surface active metals to the volume of oil in an internal combustion test engine are nearly quantitatively duplicated in the test equipment. In the "Standard" test the temperature used is approximately the average temperature of the crankcase. The rate of air flow per volume of oil is adjusted to the same as the average for a test engine in operation. Of the catalytic effects those due to iron are the most important. They are empirically duplicated by the addition of a soluble iron salt. Those due to lead-bromide are duplicated by its addition. In the "Standard" test, 0.012% of iron salt is added; and in the "Iron tolerance" test this is increased to 0.05%. The duration of the test is adjusted to that usually used in engine type tests. As is shown by the data in the papers referred to, the laboratory tests have been correlated with engine tests and the properties of the oil in an engine may be determined from the result of the laboratory tests.

The results given in the following tables were obtained from tests using:

A 160 cubic centimeter sample of the lubricant composition
70 liters of air per hour
100 square centimeters of steel surface
4.4 square centimeters of copper-lead surface
1.0 square centimeter of copper surface
0.10% by weight of lead bromide powder
0.05% soluble iron calculated as $Fe_2O_3$ in "Iron tolerance" test or 0.012% in "Standard" test (ferric 2-ethyl hexoate in C. P. benzene)

The "Standard" and "Iron tolerance" tests were run at 280° F. for 36 hours. The lacquer is deposited on the steel tube and is determined by difference in weight of the tube after washing with chloroform and drying to constant weight. The oil insoluble sludge remaining in the glass tube is thought to be related to similar sludge deposits in engines, and was rated visually against color photographic standards, and appearance rating scale ranging from F (worst) through A (best) being used. The used oil was sufficient to enable the determination of all the usual oil tests, viz. isopentane insolubles, viscosity, acid number, etc.

EXAMPLE 1

800 grams of commercial dipalmityl ketone, 260 grams of finely ground phosphorus pentasulfide, 1200 grams of No. 225 Red Oil (a commercial acid treated Mid-Continent lube oil with an S. U. S. viscosity of 225 at 100° F.), and 1200 grams of No. 300 Red Oil (a commercial acid treated Mid-Continent lube oil with an S. U. S. viscosity of 300 at 100° F.) were mixed and heated to 500° F. and maintained at that temperature for 30 minutes, all with agitation. After cooling the mixture to 300° F., 18.7 grams of elemental sulfur was added, and the resulting mixture or mass was maintained at this temperature for one hour, with agitation. $H_2S$ was evolved during these two reactions and the weight loss amounted to 93 grams. The reaction mass was filtered hot; 3232 grams of filtrate was obtained. It contained the product and was a dark red non-viscous oil at room temperature. Powdery sludge was obtained as a by-product. The product analyzed 3.6 weight per cent and 1.2 weight per cent P.

Standard tests on a solvent extracted lubricating oil base stock and compositions containing this oil and the above high temperature phosphorus pentasulfide ketone reaction product containing added sulfur were run; the properties given in the following table are representative:

Table I

|  | Blank | Oil plus Additive |
|---|---|---|
| Concentration of Additive in percent by weight | 0 | 2 |
| Lacquer Deposit (in milligrams) | 1.2 | 0.1 |
| Sludge (Isopentane Insoluble in milligrams) | 206.4 | 2.5 |
| Corrosion of Cu-Pb bearing metal (in milligrams weight loss of) | 16.2 | 4.3 |
| Acid Number | 14.5 | 1.03 |
| Viscosity Increase (SUS) | 324.6 | 125.1 |

The above enormous improvements imparted to the oil by the Example 1 additive clearly illustrate some of the marked advantages of the products of the invention.

This primary added-sulfur additive of Example 1 was also found useful as an E. P. agent. A Mid-Continent acid treated lubricating oil base stock was blended with Mid-Continent bright stock to give an S. A. E. 50 lubricant. In the conventional Timken test, this lubricant showed 15 to 20 pounds at 800 R. P. M. After this lubricant was modified by adding 9 weight per cent of the above additive, it showed 35 pounds at 800 R. P. M. in the Timken test. This is a decided improvement.

EXAMPLE 2

800 grams of commercial dipalmityl ketone, 260 grams of finely ground phosphorus pentasulfide, 1200 grams of No. 225 Red Oil (a commercial acid treated Mid-Continent lube oil with an S. U. S. viscosity of 225 at 100° F.), and 1200 grams of No. 300 Red Oil (a commercial acid treated Mid-Continent lube oil with an S. U. S. viscosity of 300 at 100° F.) were mixed and heated to 500° F. and maintained at that temperature for 30 minutes, all with agitation. After cooling the mixture to 300° F., 18.7 grams of elemental sulfur was added, and the resulting mixture or mass was maintained at this temperature for one hour, with agitation. $H_2S$ was evolved during these two reactions and the weight loss amounted to 109 grams. The reaction mass was filtered hot; 3231 grams of filtrate was obtained. It contained the product and was a dark red non-viscous oil at room temperature. Powdery sludge was obtained as a by-product.

554 grams of barium hydroxide octahydrate $(Ba(OH)_2.8H_2O)$ was added to the above filtrate and the resulting mixture or mass heated to and maintained at 200° F. for 60 minutes, with agitation. It was then heated to and maintained at 250° F., and blown with air for 8 hours. This reaction was filtered hot. 2844 grams of filtrate was obtained. It was a cloudy red oil at room temperature. This concentrate, in oil, of the metal derivative of the ketone-sulfide reaction product containing added sulfur, analyzed 5.19% by weight ash, 3.06% barium, 2.77% sulfur and 0.88% phosphorus.

The data in the following table show the results obtained in testing the Example 2 additive by the tests described, for all properties except corrosion. Corrosion of the Example 2 additive was tested by the so-called Standard Chevrolet test and the results are given hereinafter.

"Iron tolerance" tests on a conventional Mid-Continent acid treated lubricating oil base stock blended with Mid-Continent bright stock (S. A. E.

30), and compositions containing this oil and the above barium derivative of a high temperature phosphorus pentasulfide ketone reaction product containing added sulfur were run; the properties given in the following table are representative:

*Table II*

|  | Blank | Oil plus Additive |
|---|---|---|
| Concentration of Additive in percent by weight | 0 | 3.0 |
| Lacquer Deposit (in milligrams) | 39.4 | 0.1 |
| Sludge (Isopentane Insoluble in milligrams) | 809.2 | 5.6 |
| Acid Number | 9.4 | 1.76 |
| Viscosity Increase (SUS) | 658 | 46 |
| Appearance Rating | E | A+ |

These enormous improvements show the additives of the invention are outstanding. In view of these laboratory test data, Chevrolet engine tests were made on the Example 2 additive, and remarkable additive properties were shown therein. The latter are reported hereinafter.

The standardized "Chevrolet engine test" for testing lubricating oils, referred to previously, is relatively slow and expensive. New piston rings and two new copper-lead bearing inserts are installed in the engine prior to each test.

The test is primarily a corrosion test and corrosion standards of the art are associated with this test. A weight loss, from corrosion, of about 350 mgms. per bearing is acceptable but of course a lower weight loss is more desirable.

In the Chevrolet engine test, the engine is a conventional Chevrolet engine with 216.5 cu. in. piston displacement and a compression ratio of 6.5 to 1. Prior to each test, new piston rings and two new copper-lead bearing inserts are installed. The engine is operated at 3150 R. P. M. with a load of 30 B. H. P. and at a temperature at the jacket outlet of 200° F. The lubricating oil temperature is maintained at 265° F. for an S. A. E. 10 grade oil, and at 280° F. for oils of S. A. E. 30 to 50 grades. The fuel used contains from 2.5 to 3.0 ml. tetraethyl lead per gallon. Besides the weight loss of the test bearings, deposits in the power section, and properties of the used oil, sampled near the middle and also at the end of the test, are examined.

In addition to the laboratory tests, engine tests were made on the Example 2 additive of the invention. All the characteristics tested were well within accepted values. The following 36 hour Chevrolet test data is illustrative of corrosion characteristics of a Mid-Continent S. A. E. 30 oil containing 3% of the Example 2 additive of the invention:

40.4 mgms. weight loss per bearing (two half shell inserts)

This is remarkably below the acceptable 350 mgms. weight loss of the Army standard for the published CRC-designation L-4 test, and is indicative of an eminently superior product, especially in association with the laboratory test data given hereinbefore. In a 72 hour test, the weight loss was only 92 mgms. per bearing. This is impressively low.

In order to prevent foaming of oils containing a small proportion of the additives, small amounts of tetra-amyl silicate or an alkyl ortho carbonate, ortho formate or ortho acetate, or a polyalkyl silicone oil may advantageously be added.

It will be obvious to one skilled in the art, in view of the disclosure, that phosphorus sulfide-ketone reaction products and similar products obtained by reacting phosphorus and sulfur with a ketone or as prepared according to different procedures, but having substantially the same properties as those herein described, may be converted to metal derivatives, or directly used in accordance with the invention. The invention as claimed contemplates all such compositions within the scope of the appended claims.

We claim:

1. A lubricating composition comprising an oil dispersible reaction product of a saturated aliphatic ketone having at least 12 carbon atoms with a sulfide of phosphorus subjected at at least one stage in its manufacture to a temperature of at least 400° F. and below a temperature up to 600° F. at which the reaction product would be decomposed, and having an added element of the sulfur family reacted therein at a temperature in the range of 100° to 500° F.

2. A lubricating composition comprising a mineral lubricating oil and a minor amount sufficient to inhibit the oxidation thereof of an oil dispersible reaction product of a saturated aliphatic ketone having at least 12 carbon atoms with a sulfide of phosphorus subjected at at least one stage in its manufacture to a temperature of at least 425° F. and below a temperature up to 600° F. at which the reaction product would be decomposed, and having an added element of the sulfur family reacted therein at a temperature in the range of 100° to 500° F.

3. A lubricating composition comprising a mineral lubricating oil and a minor amount sufficient to inhibit the oxidation thereof of an oil dispersible metal derivative of a reaction product of a saturated aliphatic ketone having at least 12 carbon atoms with a sulfide of phosphorus subjected at at least one stage in its manufacture to a temperature of at least 425° F. and below a temperature up to 600° F. at which the reaction product would be decomposed, and having an added element of the sulfur family reacted therein at a temperature in the range of 100° to 500° F.

4. A lubricating composition comprising a mineral lubricating oil and a minor amount sufficient to inhibit the oxidation thereof of an oil dispersible reaction product of a saturated aliphatic ketone having at least 12 carbon atoms, with a sulfide of phosphorus subjected at at least one stage of its manufacture to a temperature of at least 450° and below a temperature up to 600° F. at which the reaction product would be decomposed, and having an added element of the sulfur family reacted therein at a temperature in the range of 100° to 500° F.

5. A lubricating composition comprising a mineral lubricating oil and a minor amount sufficient to inhibit the oxidation thereof of an oil dispersible metal derivative of a reaction product of a saturated aliphatic ketone having at least 12 carbon atoms, with a sulfide of phosphorus subjected at at least one stage of its manufacture to a temperature of at least 450° F. and below a temperature up to 600° F. at which the reaction product would be decomposed, and having an added element of the sulfur family reacted therein at a temperature in the range of 100° to 500° F.

6. A lubricating composition comprising a mineral lubricating oil and a minor amount sufficient to inhibit the oxidation thereof of an oil dispersible alkaline earth metal derivative of a reaction product of a saturated aliphatic ketone having at least 12 carbon atoms, with a sulfide of phosphorus subjected at at least one stage of its manufacture to a temperature of at least 450° F. and below a temperature up to 600° F. at which the reaction product would be decomposed, and having an added element of the sulfur family reacted therein at a temperature in the range of 100° to 500° F.

7. A lubricating composition comprising a mineral lubricating oil and a minor amount sufficient to inhibit the oxidation thereof of an oil dispersible reaction product of dipalmityl ketone with from 0.1 to 2.0 mols of phosphorus pentasulfide per mol of the ketone subjected to a temperature of at least 450° and below a temperature up to 600° F. at which the reaction product would be decomposed followed by reacting 0.01 to 2.0 gram atoms of added sulfur per mol of ketone at a temperature within the range of 100° to 500° F.

8. A lubricating composition comprising a mineral lubricating oil and a minor amount sufficient to inhibit the oxidation thereof of a barium compound of the reaction product of dipalmityl ketone with from 0.1 to 2.0 mols of phosphorus pentasulfide per mol of the ketone reacted at a temperature of at least 450° and below a temperature up to 600° F. at which the reaction product would be decomposed and containing 0.01 to 2.0 gram atoms of added sulfur per mol of ketone reacted at a temperature in the range of 100° to 500° F. before forming the metal compound, said metal compound containing from 0.25 to about 5.0 mols of barium residue per mol of phosphorus pentasulfide residue in the sulfide-ketone reaction product from which it was made.

9. A lubricating composition comprising a mineral lubricating oil and a minor amount sufficient to inhibit the oxidation thereof of a barium compound of the reaction product of dipalmityl ketone with from 0.1 to 2.0 mols of phosphorus pentasulfide per mol of the ketone reacted at a temperature of at least 450° and below a temperature up to 600° F. at which the reaction product would be decomposed and containing 0.01 to 2.0 gram atoms of added sulfur per mol of ketone reacted at a temperature within the range of 100° to 500° F. after forming the metal compound, said metal compound containing from 0.25 to about 5.0 mols of barium residue per mol of phosphorus pentasulfide residue in the sulfide-ketone reaction product from which it was made.

EVERETT C. HUGHES.
JOHN D. BARTLESON.

REFERENCES CITED

The following references are of record in the file of this patent:

UNITED STATES PATENTS

| Number | Name | Date |
| --- | --- | --- |
| 2,316,087 | Gaynor et al. | Apr. 6, 1943 |
| 2,316,090 | Kelso | Apr. 6, 1943 |
| 2,329,436 | Cook | Sept. 14, 1943 |
| 2,383,494 | Moran | Aug. 28, 1945 |
| 2,383,497 | Otto et al. | Aug. 28, 1945 |
| 2,383,498 | Otto et al. | Aug. 28, 1945 |
| 2,383,510 | Redman | Aug. 28, 1945 |

Certificate of Correction

Patent No. 2,506,597 May 9, 1950

EVERETT C. HUGHES ET AL.

It is hereby certified that errors appear in the printed specification of the above numbered patent requiring correction as follows:

Column 2, line 48, for "tabes" read *takes*; column 3, line 23, for "500" read *500°*; column 5, lines 25 and 26, for "derivativee" read *derivatives*; column 7, line 73, after "per cent" insert *S*;

and that the said Letters Patent should be read with these corrections therein that the same may conform to the record of the case in the Patent Office.

Signed and sealed this 15th day of August, A. D. 1950.

[SEAL]

THOMAS F. MURPHY,
*Assistant Commissioner of Patents.*